(12) United States Patent
Virtanen

(10) Patent No.: US 6,699,318 B1
(45) Date of Patent: Mar. 2, 2004

(54) PROCESS FOR PREPARING AND MODIFYING SYNTHETIC CALCIUM CARBONATE

(75) Inventor: Pentti Virtanen, Toijala (FI)

(73) Assignee: FP-Pigments Oy, Espoo (FI)

( * ) Notice: Subject to any disclaimer, the term of this patent is extended or adjusted under 35 U.S.C. 154(b) by 0 days.

(21) Appl. No.: 09/600,591

(22) PCT Filed: Jan. 19, 1999

(86) PCT No.: PCT/FI99/00033

§ 371 (c)(1),
(2), (4) Date: Sep. 5, 2000

(87) PCT Pub. No.: WO99/36361

PCT Pub. Date: Jul. 22, 1999

(30) Foreign Application Priority Data

Jan. 19, 1998 (FI) .................................................. 980107

(51) Int. Cl.$^7$ ................................................ C09C 1/02
(52) U.S. Cl. ........................ 106/464; 106/463; 106/465; 423/432
(58) Field of Search ................................ 106/463, 464, 106/465; 423/432

(56) References Cited

U.S. PATENT DOCUMENTS

| | | | |
|---|---|---|---|
| 3,920,800 A | * 11/1975 | Harris ......................... 423/161 |
| 4,133,894 A | * 1/1979 | Shibazaki et al. ........... 423/432 |
| 4,244,933 A | * 1/1981 | Shibazaki et al. ........... 106/409 |
| 5,075,093 A | * 12/1991 | Tanaka et al. ............... 106/464 |
| 5,342,600 A | * 8/1994 | Bleakley et al. ............. 106/464 |
| 5,401,313 A | * 3/1995 | Supplee et al. ................ 106/12 |
| 6,143,064 A | * 11/2000 | Virtanen ...................... 106/449 |
| 6,475,459 B1 | * 11/2002 | Virtanen ...................... 423/432 |

FOREIGN PATENT DOCUMENTS

| WO | A1-9206038 | 4/1992 |
|---|---|---|
| WO | A1-9725138 | 7/1997 |

* cited by examiner

Primary Examiner—C. Melissa Koslow
Assistant Examiner—Shalie Manlove
(74) Attorney, Agent, or Firm—Birch, Stewart, Kolasch & Birch, LLP

(57) ABSTRACT

The present invention concerns a process for preparing calcium carbonate pigment from calcium oxide and/or calcium hydroxide and carbon dioxide in the presence of water. According to the invention, the starting materials are reacted in fluid state containing at least 20 parts of volume of gas for each part by volume of suspension formed by water and solid substances, and the amount of water is essentially equivalent to the amount which is evaporated during the reaction together with the amount left in a calcium carbonate product which behaves like a powder. By means of the present invention, PCC in powder form can be prepared without the product first having to be separated from a slurry.

14 Claims, 3 Drawing Sheets

PROCESS FOR PREPARING AND MODIFYING SYNTHETIC CALCIUM CARBONATE

This application is the national phase under 35 U.S.C. §371 of PCT International Application No. PCT/FI99/00033 which has an International filing date of Jan. 19, 1999, which designated the United States of America.

The present invention relates to a process according to the preamble of claim 1 for preparing synthetically produced pigment particles containing, in particular, calcium carbonate, whereby foreign substances are added to the particles in connection with the forming of said particles in order to modify their properties.

According to a process of the present kind, a starting material containing calcium oxide is reacted with carbonate ions and other modification chemicals in the presence of water. Alternatively, the other modification chemicals are left unreacted among the rest of the material. The starting material may also comprise dry slaked $Ca(OH)_2$ either together with unslaked lime or mixed therewith.

The use of calcium carbonate, particularly precipitated calcium carbonate, is becoming increasingly common in many fields of industry, such as within the paper, the plastics and the pharmaceuticals industry. The aim is to formulate precipitated calcium carbonate (PCC) into a finely divided, pure pigment, the optical properties of which, e.g. the brightness, are important properties for many applications. Synthetic calcium carbonate (SCC) is a generic term covering also other preparation processes than traditional precipitation in liquid phase.

There are several known methods for preparing PCC. In our earlier FI Patent Application No. 950411 it is mentioned that very finely divided PCC pigment can be prepared by using finely divided slaked lime as a starting material and by allowing the crystals grow essentially without mixing and by interrupting the reaction after a specific particle size has been reached by vigorous agitation.

In FI Patent Application No. 964132, said method has been further developed by providing for monitoring of the viscosity of the nucleation mass in order to find out the proper point of time for interrupting the growth of the particles.

FI Patent Application No. 971161 discloses carbonation of calcium hydroxide with carbon dioxide in a mixing apparatus having high energy density, said energy intensity being greater than 1000 $kW/m^3$ in the free space of the mixing zone of the apparatus.

Precipitation of calcium carbonate on the surface of foreign particles is described in, e.g., published EP Patent Applications Nos. 0 375 683 and 0 604 095.

By the above-mentioned processes, a PCC product in slurry form is obtained which has to be filtered if a completely dry product is to be recovered.

The present invention aims at providing a technical solution for directly producing PCC in powder form without the need of first having to separate the product from a slurry, e.g. by filtration. The invention also aims at providing a process for easily modifying the properties of the PCC product in connection with the preparation process by combining desired modification chemicals therewith.

We have carried out tests aiming at preparing calcium carbonate which is as finely divided as possible. Surprisingly we have found in connection with these tests that the amount of water needed for ion formation during the intermediate stage of the synthesis is very small in comparison to prior experiences and knowledge. Without restricting ourselves to any particular theory, it appears to us that the phenomenon can be explained by the fact that even if a small amount of water is capable of dissolving only an infinitely small amount of soluble ions needed for formation of said ions, the extremely large mass transfer rate of the present process compensates for the water amount needed for normal precipitation.

The present invention is based on the concept that successive processes, such as slaking of lime, i.e. calcium oxide, and carbonation of the slaked lime, are carried out in a high-energy apparatus in which turbulence provided by the high energy intensity in the apparatus replaces a slow process based on diffusion only in liquid and gas. The reactions of the process are carried out at maximum dry matter content, in powder form, and as a result, the end product does not have to be concentrated e.g. by filtering or by other methods but the end product is useful as such e.g. for the production of a slurry which can be employed as filler or coating material of paper. Generally it can be noted that there is at least 20 parts by volume of gas in the carbonation reaction for each part by volume of a suspension formed by water and solid substances [primarily CaO, $Ca(OH)_2$ and $CaCO_3$)]. In practice, the water demand then only corresponds to the amount evaporated during the reaction (under the influence of the exothermal reaction and/or the processing temperature) together with the amount left in the Ca carbonate product which behaves as a powder. Thus, when the temperature of the gas is, for example, about 100° C., only about 0.8 to 1.2 parts by weight of water are needed for each part by weight of the Ca starting material. There will be left a maximum of about 40% of water in the product. In the process according to the invention, water (process water) is used as reaction water and for heat transfer/cooling.

According to the present invention calcium carbonate is not precipitated on the surface of foreign particles in a continuous phase, as disclosed in published EP Patent Applications Nos. 0 375 683 and 0 604 095. Nor do earlier publications on PCC preparation suggest that carbonation could be initiated before the calcium oxide is slaked. According to the present invention the formation of the calcium carbonate takes place directly from calcium oxide or calcium hydroxide without intermediate stages in the form of a heterogeneous, three-phase synthesis. In the present context, "three-phase synthesis" means that during the formation of the calcium carbonate there is present a solid phase (calcium oxid/calcium hydroxide/calcium carbonate), a liquid phase (water and optionally modifying agents dissolved in water) and a gas phase (carbon dioxide). The calcium carbonate is formed in the liquid phase present on the surface of a solid phase, and the calcium carbonate is released from the solid phase which forms its substrate of generation. The continued growth of the released calcium carbonate crystals is stopped because they are not in contact with the reactant substrate longer. The release of the particles takes place under the influence of three different features: The strong growth of the solid phase during the reaction; the strong temperature increase caused by the generation of reaction heat; and further the extremely strong turbulence in the apparatus.

Hydration of calcium oxide and carbonation of the hydratated part are performed one immediately after the other under the influence of efficient mixing. Then, according to the present invention, extremely small particles are at once formed which then immediately coalesce to 20 nm primary particles which agglomerate to form strong 50 nm aggregates which further generate loose 100 nm secundary aggregates which correspond to the balance between the forces acting on the particles.

These forces are, e.g., the capillary force caused by the water content, the van der Waals force, the mechanical forces caused by the turbulence of the mixing and the electric forces caused by the Z-potential. Because the process by itself gives rise to a pH in the excellent range of about 11, the isoelectric point of the Z-potential is close and there are no great resistance to the van der Waals forces. According to our calculations and measurements, a 1 to 5 molecules thick layer of water is formed on the surfaces of the particles. All ion reactions and non-ionic precipitations take place via said layer.

More specifically, the solution according to the present invention is mainly characterized by what is stated in the characterizing part of claim 1.

The present invention provides considerable advantages. Thus, the once-through time of the process from raw materials to end product is only on the order of some seconds. The present invention gives rise to a multifunctional process in which operations of earlier solutions are combined to produce the desired end product with extremely short residence time and with a small operational content. Simultaneously, it has become possible to remove intermediate depots and it has furthermore been found the the high-intensity mixing works best when the dry matter content of the treated materials is high with respect to water.

The behaviour of water in the process has been surprising. It is known that water in the form of steam is not capable of solubilizing salts, but we have learned that water spread out over a large surface in the form of a 1 to 5 molecules thick layer under the influence of the surface properties (in the present case of the SCC), does not behave as a solvent, either. The phenomenon surprisingly provides an option of influencing the crystal structure in a new way. This takes place when a suitable amount of water has been transferred to the gas phase by evaporation under the influence of a temperature increase.

The size of the forming particles can be regulated by adjusting the pH range, e.g. with NaOH or $H_2SO_4$ and by changing the intensity of the mixing and/or adjusting the initial amount of water. The starting materials of the process according to the invention comprise water, $CaO/Ca(OH)_2$ and $CO_2$. Of these substances, only calcium oxide and calcium hydroxide are actual variables. According to the invention it is preferred to have the CaO ready slaked or to slake it in the process by means of so called dry slaking, under vigorous agitation so that the $Ca(OH)_2$ structure become porous and the size of the formed particles is <3 microns and preferably <1 microns, when the agitation during the slaking is sufficiently intensive.

A particle produced by the above-defined three-phase heterogeneous synthesis is opaque (i.e. it does not give any particular direction to light) and its morphology is originally vaterite. This morphology is very suitable for coating of paper, because high opacity can be obtained.

The calcium carbonate produced by the invention lends itself to use in particular not only as a coating pigment of paper and cardboard but also as a filler of paper and cardboard. It can, however, also be employed as a filler and pigment for polymers, such as plastics and rubbers, and paints and similar dispersions. The powdery product can be mixed with water to form a mixture having a desired dry matter content of, for example, about 60 to 80%.

In the following the invention will be examined more closely with the aid of a detailed description and with reference to the attached drawings.

Figure 1:
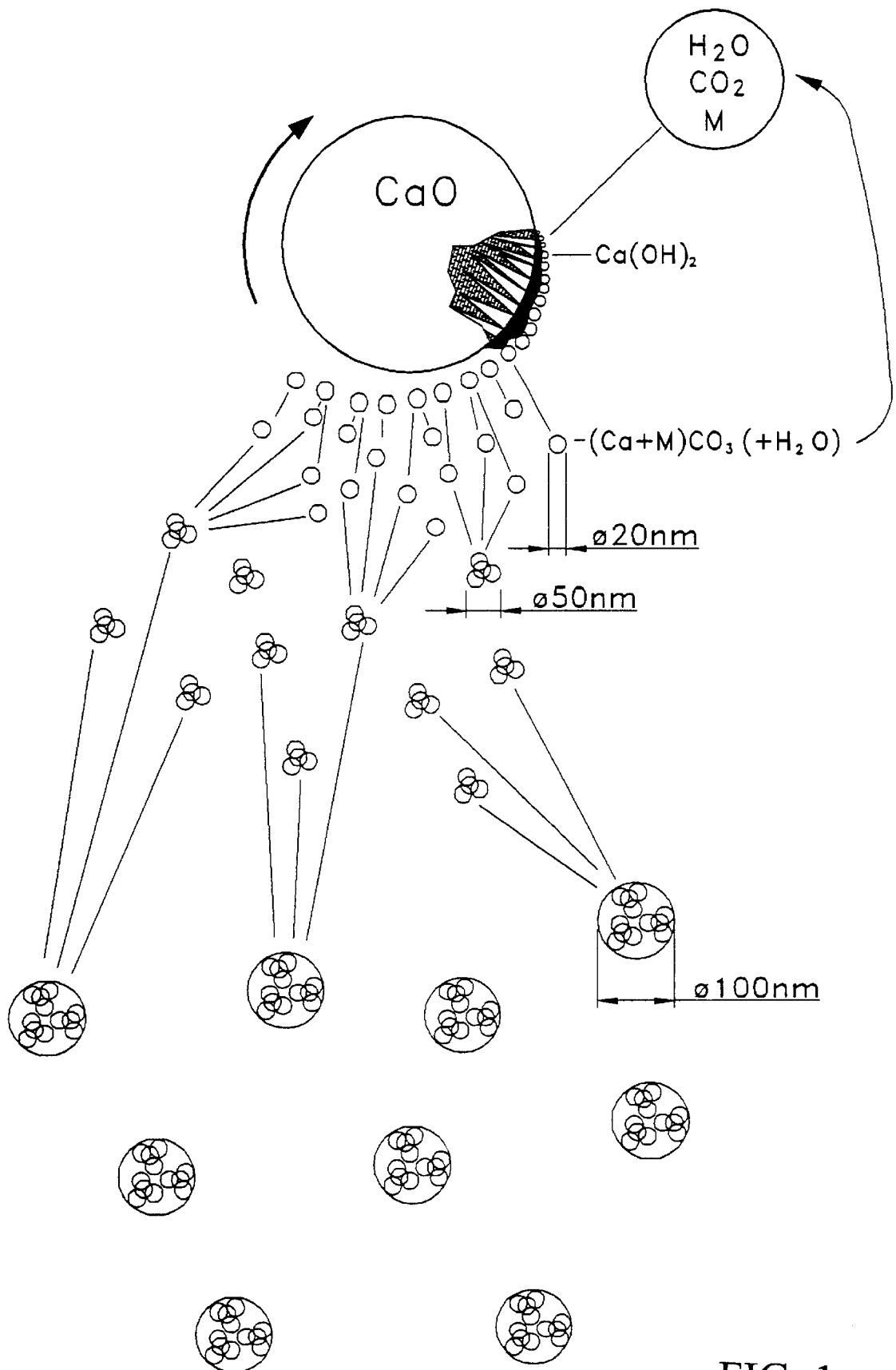
FIG. 1 shows the principle of the generation of the product, the carbonated particle being calcium oxide.

In the process according to the present invention, conventional precipitation is not used but the product is formed by means of heterogeneous phase synthesis. The term SCC is also more descriptive for this product because its properties differ essentially from those of conventional PCC qualities as regards the fine structure of the basic particles, their morphology and the very narrow size distribution of the basic particles.

Modification of the homogeneous synthesized particles means that the soluble matter originally dissolved in the accompanying water adheres to the crystal lattice and/or amorphous matrix of the generated particle. The soluble matter does not form a separate phase of its own, but the reduced solubility of said matter caused by a reduction of the accompanying free water forces these substances to transmigrate to the generated particles. The substances can be present in ionized form or they can comprise other particles which are suspended in extra water, or substances which are emulgated in said water or colloidal macromolecular compounds, such as proteins or carbohydrates. These ions are typically evenly distributed inside the carrier and partly on the surface thereof. Compounds of the present kind are e.g. Ba-, Mg-, Zn-, Al-, Mn-, Co- and Cu-compounds in the forms of carbonates and other compounds formed by cations thereof and added anions of Si, Ti, S, P and F.

In the present context, inhomogeneous modification means that subphases, such as sulphate, silicate (e.g. water glass), sulphide, phosphate etc., are formed in the carrier. These comprise separate islands which, in principle, can be separated from the crystalline or amorphous calcium carbonate matrix.

The purpose of heterogeneous modification is to bring foreign materials between the crystals or the amorphous matrix. These foreign materials change the motion of light, they put obstacles to continued crystallization or they influence the chemical properties of calcium carbonate, e.g. solubility or surface properties, which provide for enhanced affinity of the SCC particles towards, e.g. dispersants, retention aids, lubricants or colouring agents and which can be used (without limiting the applicability of the present patent) for further improving whiteness, such as stilben derivative, and improve fluorescence properties, such as zinc sulphide (Cu activated) or to coat the particle partly or entirely with coatings improving stability against dissolution such as phosphates or fluorides, or to improve dispersivity and decrease agglomeration, such as polyacrylates, polyacrylamides, starch and kationed starch. Some organometal compounds form basic compounds which comprise alkoxy compounds which hydrolyse in water and alcohol and which are very well suited to this purpose since they leave the surface of a SCC particle with a crosslinked coating comprising, e.g. titanium dioxide or silicon dioxide. There are many other possiblities, but these cannot be discussed in detail in the present context. The aim has been to show that with the present process it is possible to implement an innumerable amount of additional additions or coating which cannot be obtained with other, known methods as easily.

The PCC product obtained is in the form of a powder. By this is meant, in connection with the present invention, that it can be blown and separated with a blowing test. The product does not contain free water and its dry matter content is greater than 60%, preferably 80 to 100%.

The process according to the invention is divided into various embodiments which all have in common the said quick throughput time of the process and the high-intensity mixing process needed for it.

Generally, quick lime and water are mixed in a fluid state in a powerful mixer. In the fluid, the main part is gas that contains solid matter and liquid (dispersion+aerosol). The amount of gaseous phase in the fluid is at least 20 parts by volume per one part by volume of the suspension, and the amount of liquid phase is 1 to 20 parts per solid matter phase. The high-intensity mixing process preferably works in a fluid medium where there are typically present, for example, 1000–10,000 parts by volume of gas and steam/mist and 1 part of solid matter and 0.5 to 2 parts of water, all indicated by volume. Treatment in such a fluid does not recognise viscosity limits or other phenomena brought about by it, such as difficult transfers of material in the intermediate phases. More water can be fed to the reaction but then due care has to be taken to ensure evaporation or corresponding removal of the water, if a powdery product is to be obtained.

The process according to the invention is carried out via the steps indicated by the following reactions:

$$CaO + H_2O aq \rightarrow Ca(OH)_2 (+H_2O)$$

$$CO_2 + H_2O \rightarrow HCO_3^- + CO_3^{2-}$$

$$Ca(OH)_2 + CO_2 + CO_3^{2-} \rightarrow CaCO_3 + H_2O$$

The dissolved modification agents and additives fed together with the slaking water of the lime are transferred into the formed particle and on the surfaces thereof. The mechanism for the generation of nano-aggregates and agglomerates is also shown in the appended FIGS. 1 and 2.

During carbonation, calcium oxide (FIG. 1) is thus subjected to an intensive agitation field together with water and carbon dioxide, whereby its surface layer begins to hydrate and, as a consequence of the hydration, $Ca(OH)_2$ is obtained which immediately, at the same time, begins to carbonate. The calcium carbonate obtained from the reaction is of even quality. Namely, very small PCC particles are generated in the carbonation or causticising, correspondingly, onto the surface of the lime particles. As a consequence of the turbulence produced by the mixing device, impact energy and the heat generated, these particles, however, detach from the surface of the calcium oxide or calcium hydroxide particles. They do not remain independent in the mixer fluid but primary particles quickly combine to form larger particle aggregates or clusters of about 10 to 30, typically about 15 to 20 particles. Their size is about 40 to 100 nm. The aggregates provide agglomerates, i.e., botryoidal bunches that contain about 500–600 aggregates that combine with one another. The size of the agglomerates is about 100 to 1000 nm, e.g. about 500 nm. They are fairly strong and endure the turbulence of the reactor. When larger, looser agglomerates are grown, the turbulence is decreased. The formation of these agglomerates can be carried out by adjusting the pH value so that the Z-potential of the particles is as low as possible.

Figure 2:
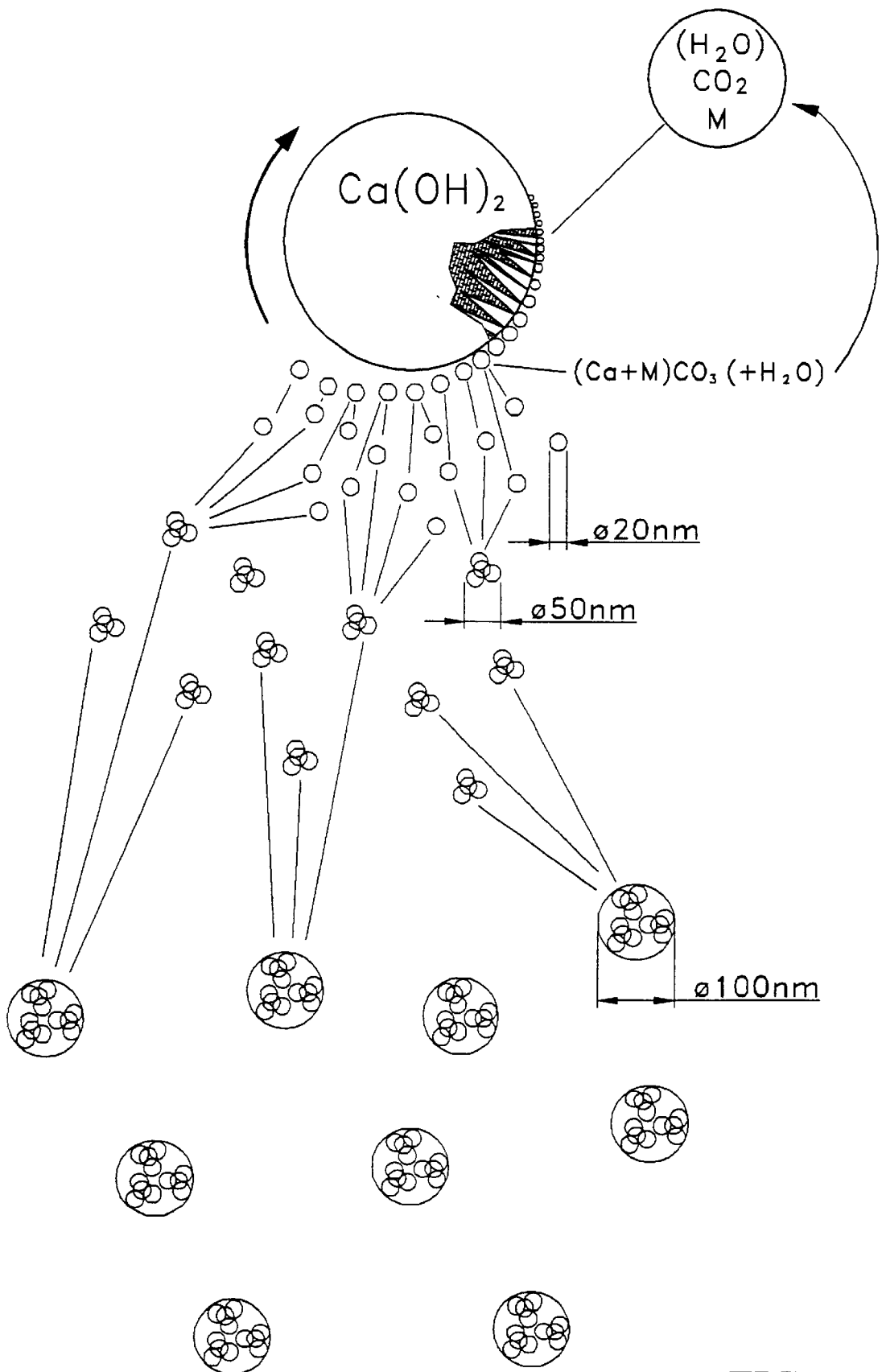
FIG. 2 shows the generation mechanism of the same product, calcium hydroxide particles being carbonated during the reaction.

The embodiment of FIG. 2 is analogous to that above described. It comprises, however, the difference that the starting material used is calcium hydroxide instead of calcium oxide.

The particles size distribution of the product according to the invention is rather steep, which is due to the precise control of the particle formation. Thus, in practice, 90% or even 95% of the particles are smaller than 500 nm.

As mentioned above, the properties of the produced PCC can be modified by feeding into the process additives which give the generated particles the desired properties, such as whiteness, opacity, fluorescense, phosphorescens, which improve the formation of triboelectric properties, increase electrical conductivity, reduce the solubility of the surface of the SCC particles at acid conditions, increase the adhesion of the particles to anionic fibres or surfaces, or reduce the tendency of the particles to agglomerate or flocculate. The modification chemical is designated the letter M in FIGS. 1 and 2.

In practice, the equipment according to the present invention functions so that several high-power mixers/grinders are in series so that they form a cascade in which, at least in the first stage, at least partial hydration of calcium oxide is carried out and, immediately after it or at the same time, the reagent, the carbon dioxide causing the carbonation, is introduced. The calcium oxide can also be separately slaked and this feature is not a limiting characteristic of the present invention.

The whole process, from feeding the calcium oxide into the device and removing the ready product from the device, takes 5 seconds maximum and 0.1 seconds minimum, typically 1.5 to 3 seconds.

As mentioned above, the calcium carbonate particles generated in the process are not crystalline because normal crystallisation cannot take place in such a short onset time. They belong to the class of so-called vaterite, i.e., amorphous calcium carbonate. This amorphousness and the complete round, spherical shape occurring at the same time, as well as very precisely the same particle size distribution mean that the surface energy of each discrete pellet is the same. Therefore, they are stabile in resisting crystallisation and dissolution and, further, crystallisation into a new shape that is thermodynamically more stabile.

The process can further be used for preparing structurized pigments, whereby another ready made pigment, such as kaolin, talc, chalk, PCC or $TiO_2$, is fed in addition to the starting raw materials, CaO and/or $Ca(OH)_2$. Then, at least a part of the forming 20 nm basic particles are attached to the surface of ready carrier pigments and another parts forms aggregates of its own. Tribomechanical and triboelectrical points, to which the small SCC particles (20 nm) easily attach, are formed on the coating particles due to impact and attrition. This structurized pigment exhibits excellent opacity, in particular if the refractory index of the coated carrier particle is higher than that of the formed SCC particles. Both the difference between the refractory index and the gas-filled spaces between the particles provide for excellent optical properties. In addition, such spaces are excellent capillary adsorption points for printing ink because they prevent lateral transfer of the ink. This means rapid "drying" and sharp impressions.

The preferred coated particles are $TiO_2$ and $Al_2O_3$, aluminium oxide being so much more inexpensive that it gives an economically better result. If the basic particles in addition to $CaCO_3$ are further modified, e.g. such that they contain separate phases, this gives an optically more advantageous result also in the present case.

From all material technology it is generally known that amorphous materials tend to form crystalline phases as time passes, because the energy level of crystals is lower than for amorphous masses. It is further known that the crystalline part present in amorphous matter changes the motion of light (density, different refractory index). In certain cases this feature may prove useful either optically or because of changes in the solubility of calcium carbonate particles; crystals dissolving more slowly than amorphous matter. The degree of crystallization can be regulated by maturing (=time×temperature) or restricted by impurities which, as known, generally comprise organic chemicals, typically sugars, glycols, polyglycols, polysaccharides, alcohols etc. dissolved in water. Both maturation of crystallinity and restriction of crystallinity have their respective advantages as regards the intended further use. The process according to the present invention makes it advantageously possible to restrict the crystallinization by adding small amounts of above mentioned additives.

Figure 3:
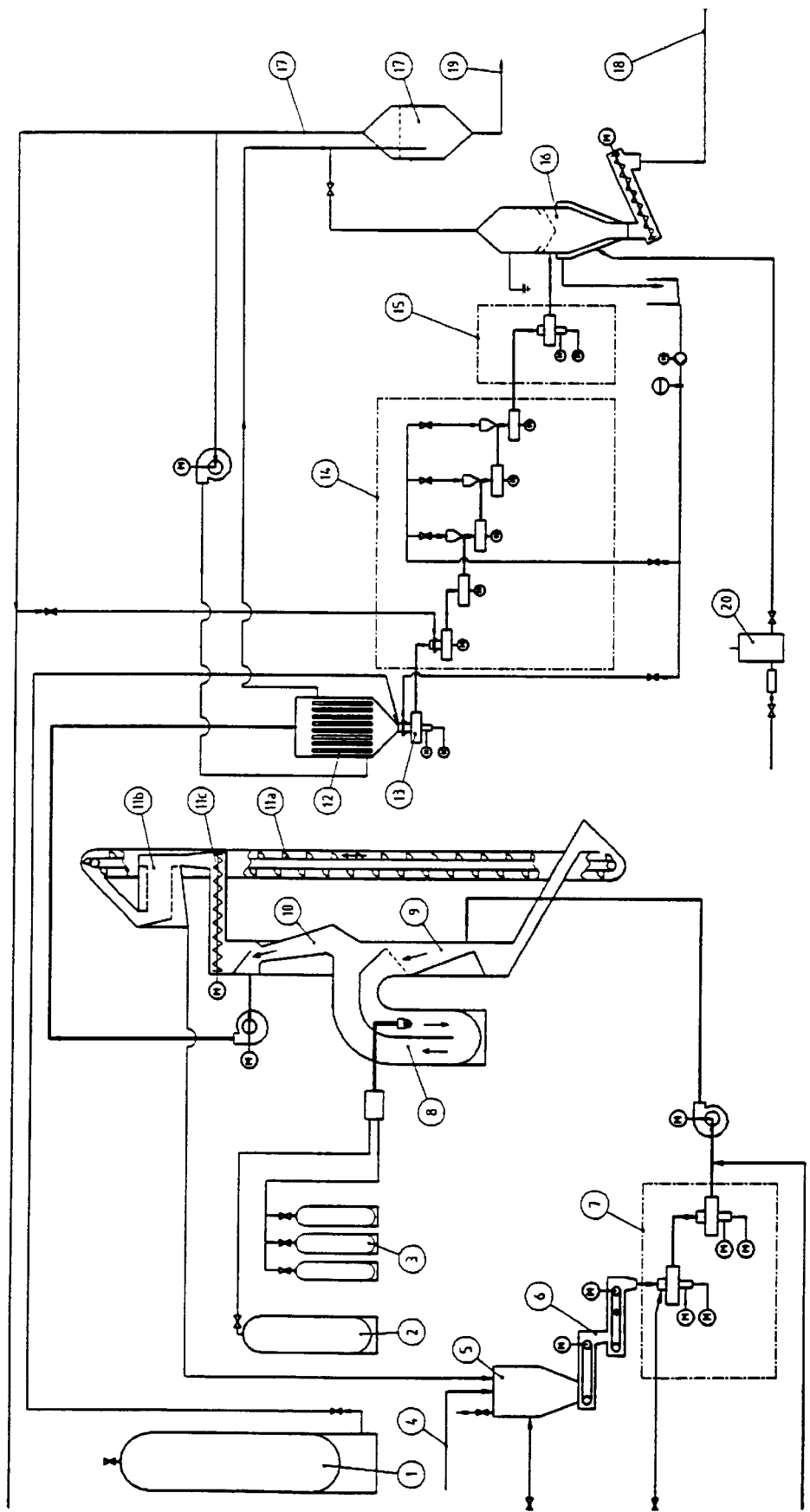
FIG. 3 depicts in a schematic fashion the basic structure of an apparatus according to a preferred embodiment of the present invention.

FIG. 3 shows a diagrammatic plan of an embodiment of the apparatus used in the invention. The following reference numbers are used in FIG. 3:

1 Carbon dioxide container
2 Oxygen container
3 Propane container
4 Limestone feed
5 Storage funnel for limestone
6 Belt conveyor and weighing
7 Grinding of limestone
8 Combustion of limestone
9 Preheating of ground limestone and circulation gas
10 Cooling of quick lime and carbon dioxide
11 Equipment for treating the heat carrier
11a Lifting elevator for the heat carrier
11b Heat carrier sieve
11c Temper screw for heat carrier
12 Heat exchanger
13 Slaking
14 Carbonation equipment
15 Stabilization; triboelectric charging apparatus for particles
16 Earthing and receiving tank for triboelectrically charged particles
17 Jet condensation system
18 PCC powder
19 Condensing water
20 Pretreatment of water
21 Circulation gas/carbon dioxide In the schematic presentation of a production apparatus for PCC depicted in FIG. 3, the preparation is based on carbonation. The equipment comprises a part (reference numbers 4 to 7) where raw material, i.e., limestone is mechanically treated, a burning unit for limestone (reference numbers 8 to 12), a carbonation unit (reference numbers 13 to 16), and recovery and recycling of gases (reference numbers 17 and 21). Further, the equipment includes containers for the raw materials carbon dioxide (reference number 1), oxygen (2) and propane (3).

The limestone crushed in storage funnel 5, fed along line 4, is optionally preheated and, when needed, any snow and ice among the limestone is melted. Belt conveyor transfers the limestone to belt conveyor scale 6. By adjusting the speed of the conveyor the amount of limestone going into the process is adjusted. A metal detector is arranged in connection with the conveyor to detect possible metal objects that are separated and transferred to a waste bucket.

Thereafter, the weighed amount of limestone is fed to grinding 7 where the limestone is ground by a two-step impact pulveriser, whereby limestone powder is obtained, 90% of its particles having a size of less than 90 $\mu$m. The powder is conveyed from grinding 7 to preheaters 9, 10 with the aid of a blower. Additional gas is brought to the suction face of the blower from condensing jet 17.

The powdered limestone is preheated in a heat treating apparatus (heat exchangers 9, 10) the limestone being heated in the lower part 9 thereof and the burnt lime (calcium oxide) and the carbon dioxide being cooled in the upper part 10. In the preheater part 9, the hot (800–900° C.) heat transfer material flows down the middle channel of the heat exchanger and the fluidised limestone powder is blown through the bed thus formed in various phases by using the counterflow principle. When arriving at the heat exchanger, the temperature of the fluid is 20–100° C., increasing to about 700° C. in the heat exchanger. At the same time, the temperature of the heat transfer material drops to about 200° C.

Thereafter, the preheated limestone powder is conveyed to burning of limestone 8 where the carbon dioxide is separated from the calcium carbonate so that burnt lime, i.e., calcium oxide is produced according to the following equation: $CaCO_3 \rightarrow CaO+CO_2$. Burning is carried out in fluid tube 8 where the temperature of the particles is increased to about 900–1400° C. by using burners. In the burners, propane is burned with oxygen, whereby carbon dioxide and aqueous steam is released through the reaction $C_3H_8 + 5O_2 \rightarrow 3CO_2+4H_2O$. The propane is taken to burning from propane container 3 and oxygen from oxygen source 2 where it is separated from air, e.g. by using a molecular sieve to produce pure $O_2$ with a pressure of, for example, 2 bar.

The cold heat transfer material from the preheating section 9 of limestone is circulated to the preheating equipment 9, 10 with an ascending conveyor 11a. The material obtained with the conveyor is screened 11b before it is retured via the temper screw 11c to the cooling section 10.

1–5 mm crushed limestone can be used as the heat transfer material. The burnt limestone powder obtained from the cooling section 10 is conducted to carbonation by using blower 12 and via a heat exchanger. The flow rate of the fluid in the cooling section 10 of the heat exchanger is simultaneously regulated with blower.

The calcium oxide is slaked, if desired, in slaking apparatus 13 to which water is fed (cf. the embodiment of FIG. 2). After the optional slaking, the raw material for carbonation is conducted to the carbonation equipment 14. The equipment comprises several turbulence mixers of the impact pulveriser type which are arranged in series so that they form a set of stages in a cascade. At each stage, the product at that stage can be modified. The process is essentially a parallel flow process where all the reactants move in the same direction. The water that determines the dry content of the product is fed to the desired step of the carbonation equipment.

The product obtained from carbonation 14, i.e., the precipitated calcium carbonate (PCC) is separated from the fluid gases ($H_2O+CO_2$).

The fluid gases of carbonation, i.e., water and carbon dioxide, are recovered in jet condensing system 17 comprising condensing jet section, drop separator, and condenser. In the condensing jet section, gases are cooled with a water jet and the water vapour is condensed to water. Drop separator prevents the water from ascending as drops to the upper part of the separator and condenser is used to cool the carbon dioxide that goes into circulation. Through pipe 21, the uncondensed gases recovered in the condenser are returned to be used in the process and the condensed water is removed from the bottom of condenser 19. The carbon dioxide that is collected can be conducted, for example, through pipe 22 to carbonation 14, to heat exchanger 9, 10 to be used as the cleansing blower gas of the heat transfer material and as the carrier gas of limestone.

The desired product, i.e., the precipitated calcium carbonate (PCC), is recovered as a dry PCC powder 18. If necessary, it can be slurried by feeding water into receiver 16 from the apparatus 20 for pretreatment of water used, e.g., for removing ions from the water.

The operation of receiver 16 is the following:

The present process provides a very finely divided dry powder. Such powder causes, in principle, significant dusting and the recovery of the powder from carrier gases has been considered a problem. Surprisingly, even said problem has been solved by the present invention by means of a simple solution. It has been found that if the SCC powder of the last mixing stage is sufficiently dry (>95%), the particles are triboelectrically charged under the influence of the mixing and they do not therefore agglomerate since they all have an electrical charge of the same sign. When the receiver 16, which may comprise a cyclone or a simple container, to which the dusty carrier gas is discharged, is earthed, the particles drift towards the walls of the vessel, their charge is discharged and they are accumulated on the bottom of the vessel. In the test carried out, the effect has been so efficient that the jet washer 17 arranged after the receiver 16 used for cleaning gas from solid matter particles has only received about 0.5 to 2% of the total amount of dust for treatment.

In order to enhance said triboelectric effect during the last mixing stage, the product can be contacted with the surface of a ceramic material. This can be carried out by, e.g., manufacturing the rotor wings from a ceramic material or by coating them with a surface layer consisting of such a material.

Even if PCC even normally is present as a powder after the process, it has been possible to raise the dry matter content by feeding additional heat from outside the process into the circulating gas. Said heat has been used for heating said circulating gas in order thereby to evaporate further water from the forming particles. The circulating gas of the process is then cooled after the separation of the particles in order to remove the extra water evaporated therein, and the water can be recirculated to the raw material fed into the process.

What is claimed is:

1. A process for preparing a calcium carbonate pigment from calcium oxide and/or calcium hydroxide and carbon dioxide in the presence of water comprising reacting calcium oxide and/or calcium hydroxide and carbon dioxide in a fluid state, wherein the amount of gas comprises at least 20 parts by volume for each part by volume of a suspension formed by water and solids, and the amount of water comprises 0.8 to 1.2 parts by weight for each part by weight of the starting material CaO/Ca(OH)$_2$ when the temperature of the gas is about 100° C.; and obtaining a powder carbonate product.

2. A process for preparing a calcium carbonate pigment comprising reacting calcium oxide and/or calcium hydroxide and carbon dioxide in the presence of water and further dissolving into the mixture of calcium oxide and/or calcium hydroxide and carbon dioxide modification agents and additives which are emulgated or suspended or colloidally dissolved therein, and wherein the water is in the form of steam or mist, and the volume of gas is at least 20 times larger than the volume of the mixture, and the formed powder calcium carbonate contains a small amount of water.

3. The process according to claim 1 or 2, wherein particles obtained from the process are separated from the gas phase by triboelectrical effect.

4. The process according to claim 3, wherein the process is carried out in several mixing stages, wherein the particles are dry at the last mixing stage so that the particles obtain an electrical charge which is utilized for separation of the particles from the fluid gas by conducting the particles to a grounded receiving device.

5. The process according to claim 4, wherein the particles are contacted with ceramic materials during the last mixing stage.

6. The process according to claim 3, wherein external additional heat is brought to the circulating gas for vaporizing more water from the formed particles by heating said circulating gas.

7. The process according to claim 3, wherein the circulating gas of the process is cooled after the separation of the particles in order to remove superfluous evaporated water contained therein.

8. The process according to claim 1, according to which the production of the calcium carbonate takes place by a multistage carbonization process, wherein additives and optional modification agents and additives are added in the process at the earliest stage after the first carbonization step, in order to provide a coated heterogeneous additive zone.

9. The process according to claim 3, comprising feeding into the process additives capable of giving the particles the desired properties, such as whiteness, opacity, fluorescense, phosphorescense, or which are capable of improving the forming of triboelectric properties, of increasing electrical conductivity, of reducing solubility of the surface of the synthetic calcium carbonate particles at acid conditions, of increasing the adhesivity of the particles to anionic fibers or surfaces, or of reducing the tendency of the particles to agglomerate and flocculate.

10. The process according to claim 1, wherein the product prepared is in ionized form or the product is modified with an organic chemical dissolved in water.

11. The process according to claim 10, wherein the ionized form is Si- or Ti-compounds which are organosilanes or organotitanates which hydrolyze and precipitate on the surface of synthetic calcium carbonate particles functioning as carriers.

12. The process according to claim 1, wherein the carbonation reaction is carried out in a fluid medium, in which there is present 100 to 10,000 parts by volume of gas and steam, 1 part by volume of solid matter and 0.5 to 1 parts by volume of water.

13. The process of claim 10, wherein the organic chemical is selected from the group consisting of glycols, polyglycols, polysaccharides and alcohols.

14. The process of claim 10, wherein the ionized form is made of ionic compounds selected from Ba-, Mg-, Zn-, Al-, Mn-, Co-, Cu-compounds in the form of carbonates and other compounds formed by cations thereof and anions of Si, Ti, S, P and F.

* * * * *